Patented Apr. 29, 1952

2,594,481

UNITED STATES PATENT OFFICE 2,594,481

SEPARATION OF ALCOHOLS

Norman J. Bowman, Gary, and Alfred W. Weitkamp, Whiting, Ind., assignors to Standard Oil Company, Chicago, Ill., a corporation of Indiana No Drawing. Application September 30, 1948, Serial No. 52,123

10 Claims. (Cl. 260—643)

This invention relates to the separation of alcohols. More particularly, it relates to the segregation of various types of alcohols by converting a mixture thereof into carboxylic acid esters and contacting the resulting mixture of esters with urea, whereby solid urea adducts are formed with certain types of esters. In one specific embodiment, our invention relates to the segregation and separation of primary aliphatic alcohols and secondary straight-chain aliphatic alcohols from admixture with other alcohols.

Our invention is based on our discovery, set forth in our copending joint application, Serial No. 52,122, filed September 30, 1948, that urea forms solid adducts with certain monomethyl-branched esters, as hereinafter defined, whereas it does not form adducts with more highly branched esters. By use of this selective reaction, in combination with other process steps to be described more fully hereinafter, we are now able to segregate mixtures of alcohols into five fractions, consisting of (1) primary straight-chain aliphatic alcohols, (2) primary monomethyl-branched aliphatic alcohols, (3) secondary straight-chain aliphatic alcohols having the hydroxyl group in the 2 position, (4) other secondary straight-chain aliphatic alcohols, and (5) other alcohols.

According to the prior art, urea forms solid adducts with numerous straight-chain organic compounds, including hydrocarbons, alcohols, aldehydes, ketones, and n-alkanoic acids and their ethyl etsers; and this reaction has been utilized for the separation of such straight-chain compounds from admixture with other organic compounds. We have observed, however, that the reaction of urea with alkanoic acids is not selective for the n-alkanoic acids. Instead, urea reacts indiscriminately with alkanoic acids in general, evolving heat and forming a hard cake, rather than the crystalline adduct ordinarily obtained with straight-chain organic compounds.

We have further observed that urea forms solid adducts with straight-chain alcohols regardless of the point on the carbon chain at which the hydroxyl group is substituted. The direct use of urea to separate primary straight-chain aliphatic alcohols from secondary straight-chain aliphatic alcohols is therefore not feasible. Moreover, the direct separation of such alcohols by conventional means, such as fractional distillation, fractional crystallization, and the like, is often difficult or impossible, owing to their close similarity of physical and chemical properties.

We have now made the surprising discovery, which the prior art nowhere discloses or suggests, that the formation of solid urea adducts with carboxylic acid esters is a highly selective reaction, being dependent upon the extent and position of branching, the position of the characteristic carbonyloxy group, the length of the straight carbon chain or chains attached to the carbonyloxy group, and the nature of any other substituents in the ester molecule. It is known that urea adducts are formed with certain straight-chain ethyl esters, whereas adducts are not formed with esters of cyclic acids or with esters containing cyclic substituents in the molecule. We have now discovered that urea forms adducts with monomethyl - branched esters wherein the straight-chain terminal portion containing the characteristic carbonyloxy group

contains also at least four methylene groups, whereas urea does not form adducts with more highly branched esters (that is, esters containing an ethyl branch or a higher hydrocarbon substituent, or more than one methyl branch), or with monomethyl-branched esters wherein the straight-chain terminal portion containing the carbonyloxy group comprises less than four methylene groups.

The urea-reactive class of monomethyl-branched esters may be represented by the generic skeletal formula

where R is a straight-chain aliphatic radical and E is a terminal straight-chain ester group having one of the following skeletal formulas:

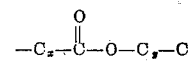

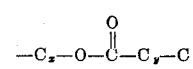

where $x$ and $y$ are zero or a positive integer, where the sum of $x$ and $y$ is at least four, and where $C_x$ and $C_y$ respectively represent straight carbon chains when $x$ or $y$ is greater than one. In the above formulas, the otherwise unsatisfied valences of the carbon atoms are in general attached to hydrogen atoms, but we have further observed that the adduct-forming capacity of esters is substantially unaffected by the presence in the molecule of an olefinic double bond, and/or a hydroxyl group, and/or a fluorine atom.

On the basis of the foregoing observations, we have now devised a new process involving the esterification of a mixture of alcohols and the selective reaction of urea with the resulting esters, by means of which we are able to effect the segregation and separation of alcohols into various groups, as hereinbefore defined.

One object of our invention is to separate alcohols from one another and from other organic compounds. Another object of our invention is to segregate mixtures of alcohols into generically different classes according to the location of the hydroxyl group therein. A further object of our invention is to segregate alcohols into generic types according to the configuration of their carbon skeletons. A still further object of our invention is to purify straight-chain and monomethyl-branched aliphatic alcohols. A still further object of our invention is to separate alcohol fractions of special characteristics and high utility from complex mixtures thereof with other organic compounds. A special object of our invention is to effect a separation between primary straight-chain aliphatic alcohols and secondary straight-chain aliphatic alcohols. Other objects of our invention, and its advantages over the prior art, will be apparent from the following description, examples, and claims.

In a simple embodiment of our invention, a charging stock comprising a straight-chain primary aliphatic alcohol, a monomethyl-branched primary aliphatic alcohol, or a straight-chain secondary aliphatic alcohol having the hydroxyl group in the 2 position, preferably but not necessarily free from other urea-reactive constituents, is first treated by conventional means to convert the alcohol into a urea-reactive monomethyl-branched ester of an aliphatic carboxylic acid, as defined above. The esterified charging stock is then agitated with urea, preferably in the presence of a urea activator such as water, and the resulting slurry is filtered, centrifuged, or settled and decanted to separate the solid adduct therefrom. The adduct thus separated contains urea and the ester; and if other urea-reactive substances such as straight-chain organic compounds containing six or more carbon atoms in the molecule, or free carboxylic acids, were absent from the charging stock, the adduct contains the urea-reactive ester in substantially pure form. The adduct may be washed with an inert organic liquid, such as a branched-chain, naphthenic, or aromatic hydrocarbon, having substantially no reactivity with or solvency for urea, in order to remove occluded mother liquor therefrom; and may thereafter be decomposed to liberate the ester, from which the original alcohol may be recovered in purified form by saponification.

In carrying out the reaction with urea, the esterified charging stock may first be dissolved in an inert organic liquid, such as a branched-chain, naphthenic, or aromatic hydrocarbon. This is especially desirable where the esterified charging stock is a viscous liquid or a solid. The quantity of urea required may be calculated on the basis of the quantity of adduct-forming ester in the charging stock. The molar ratio of urea to such ester is preferably at least equal to the total number of methylene groups in the ester group E, defined above, of the urea-reactive ester.

In the reaction mixture or in the urea may advantageously be incorporated a urea activator, preferably water, methanol, ethanol, acetone, propionaldehyde, or other lower aliphatic alcohol, lower aliphatic aldehyde, or lower aliphatic ketone. Other organic oxygenated compounds may also be used as urea activators, such as amyl acetate, ethyl ether, methyl n-amyl ketone, n-dodecyl alcohol, 2-ethyl-1-hexanol, 1-octanol, and the like; but they are not in general as effective as the preferred activators recited above. The molar ratio of activator to urea may range up to the quantity required to form a saturated solution of urea therein. Excellent results may be obtained, for example, within the range of about 0.05:1 to 1:1, but we prefer to operate between about 0.1:1 and 0.6:1. The reaction temperature is not critical, but should be high enough to maintain the charging stock in liquid form, and low enough to avoid melting and decomposing the urea adduct. Temperatures between about 0 and 90° C. are ordinarily satisfactory, but we prefer to operate between about 20 and 75° C. The time of contact between the urea and the charging stock is likewise not a critical variable. Adduct formation begins to take place almost instantaneously, and may be virtually complete in as little as 0.1 hour in some cases, especially when a urea activator is employed. We prefer in general to contact the reactants for a reaction period ranging from about 0.25 to 1.0 hour in order to insure substantially complete reaction between urea and ester.

Decomposition of the urea adduct and liberation of ester may be effected by dissolving the adduct in an excess of a urea solvent, such as water, methanol, ethanol, acetone, and the like, at a temperature above the melting point of the ester. We prefer to use water, since the ester liberated thereby separates as a second phase from the resulting aqueous solution of urea. Alternatively, we may decompose the adduct by heating it to a temperature above its melting point, ordinarily around 125° C. The ester is liberated thereby as a separate phase, which may be withdrawn. Thereafter, the ester may be decomposed according to wellknown procedures to regenerate the alcohol constituent thereof in purified form, or the ester may be subjected to radical interchange with another alcohol to liberate the desired alcohol, or to radical interchange with another acid to produce a different ester of the desired alcohol.

In another embodiment of our invention, a charging stock comprising a straight-chain primary aliphatic alcohol and a straight-chain secondary aliphatic alcohol is first treated by conventional means to convert the alcohols therein into esters of a suitable aliphatic carboxylic acid. The acid is chosen in accordance with the disclosure, above, to produce a primary-alcohol ester that forms a solid adduct with urea, and a secondary-alcohol ester that does not form an adduct. The choice of acid will therefore rest on the length of carbon chain required and on whether a methyl branch in the acid is necessary to prevent the secondary-alcohol ester from forming a urea adduct. The esterified charging stock is then contacted with urea, a urea adduct is separated, and the adduct is decomposed to liberate the primary-alcohol ester, from which the primary alcohol may be recovered by saponification. Subsequently, the depleted charging stock may be saponified to regenerate the straight-chain secondary alcohol therein, which may then be separated by urea treatment of the saponified charging stock.

In another embodiment of our invention, a charging stock comprising a secondary straight-chain aliphatic alcohol having the hydroxyl group in the 2 position and another secondary alcohol having the hydroxyl group in another position is esterified with a straight-chain aliphatic carboxylic acid, so chosen in accordance with the disclosure above that the ester of the alcohol having the hydroxyl group in the 2 position is urea-reactive. Thereafter, the esterified charging stock is treated with urea to separate the urea-reactive ester as a solid adduct.

In another embodiment of our invention, we may first contact a charging stock comprising alcohols with urea to separate therefrom a mixture of the straight-chain aliphatic alcohols in the form of urea adducts. On being liberated from the adduct, the mixed alcohols may then be esterified, as disclosed above, and again treated with urea to segregate the alcohols into groups as set forth more fully above.

Our process is capable of separating a mixture of alcohols into the following groups: (1) primary straight-chain aliphatic alcohols, including 1-alkanols such as methanol, ethanol, 1-propanol, 1-butanol, 1-hexanol, 1-decanol, 1-tetradecanol, 1-octadecanol, and the like; and alkene-1-ols such as allyl alcohol, 2-hexene-1-ol, 3-hexene-1-ol, 4-hexene-1-ol, 2-octene-1-ol, 8-decene-1-ol, 5-tetradecene-1-ol, 9-octadecene-1-ol, and the like; (2) monomethyl-branched primary aliphatic alcohols such as isobutyl alcohol, 6-methyl-2-heptene-1-ol, 4-methyl-1-octanol, 5-methyl-1-decanol, 2-methyl-11-tridecene-1-ol, and the like; (3) secondary straight-chain aliphatic alcohols having the hydroxyl group attached to the penultimate carbon atom, such as isopropyl alcohol, 2-pentanol, 2-octanol, 2-dodecanol, 2-hexadecanol, 3-butene-2-ol, 1-hexene-2-ol, 5-heptene-2-ol, and the like; (4) other secondary straight-chain aliphatic alcohols; and (5) other alcohols, including branched-chain secondary aliphatic alcohols, tertiary aliphatic alcohols, cyclic alcohols, and cyclic-substituted aliphatic alcohols. Any of the foregoing alcohols may include a substituted fluorine atom without substantial alteration in the urea-reactivity of the alcohols or their esters.

Our process is further capable of effecting a separation between members of any one of the foregoing groups by an appropriate choice of acid for the esterification step, so that one, but not all, of the resulting esters undergo adduct-formation with urea, in accordance with the disclosure above.

The following is a complex embodiment of our invention:

*Step 1.*—A charging stock containing ethanol, isopropyl alcohol, tertiary butyl alcohol, 5-methyl-2-hexanol, capryl alcohol, 1-decanol, isodecyl alcohol, and 4-tetradecanol is esterified with isobutyric acid, and the resulting mixture of esters is contacted with urea under the conditions set forth above. A solid urea adduct is formed with n-decyl isobutyrate, and is withdrawn.

*Step 2.*—The residual esters are saponified and the regenerated alcohols are re-esterified with isocapric acid. The resulting esters are contacted with urea, and an adduct containing ethyl isocaprate is withdrawn.

*Step 3.*—The residual esters are converted into acetates, which are then contacted with urea. An adduct containing isodecyl acetate is withdrawn.

*Step 4.*—The residual esters are converted into caprylates, which are then contacted with urea. An adduct containing isopropyl caprylate and 1-methylheptyl (capryl) caprylate is withdrawn.

*Step 5.*—The residual esters are saponified, and the regenerated alcohols are contacted with urea. An adduct containing 4-tetradecanol is withdrawn. The raffinate comprises 5-methyl-2-hexanol and tertiary butyl alcohol. Neither of these alcohols nor their esters form adducts with urea.

Alternatively, the following procedure may be used for separating the complex mixture of alcohols described above:

*Step 1A.*—The charging stock containing ethanol, isopropyl alcohol, tertiary butyl alcohol, 5-methyl-2-hexanol, capryl alcohol, 1-decanol, isodecyl alcohol, and 4-tetradecanol is contacted with urea, and a solid urea adduct containing capryl alcohol, 1-decanol, and 4-tetradecanol is withdrawn, leaving a raffinate containing ethanol, isopropyl alcohol, tertiary butyl alcohol, 5-methyl-2-hexanol, and isodecyl alcohol.

*Step 2A.*—The urea adduct is decomposed, the liberated alcohols are esterified with isovaleric acid, the esters are contacted with urea, and an adduct containing n-decyl isovalerate is withdrawn.

*Step 3A.*—The residual esters from Step 2A are converted into caprylates and contacted with urea, and an adduct containing 1-methyl-heptyl caprylate is withdrawn, leaving the caprylate of 4-tetradecanol in purified form.

*Step 4A.*—The raffinate from Step 1A is esterified with isocaprylic acid and contacted with urea, and an adduct containing ethyl isocaprylate is withdrawn.

*Step 5A.*—The residual esters from Step 4A are converted into butyrates and contacted with urea, and an adduct containing isodecyl butyrate is withdrawn.

*Step 6A.*—The residual esters from Step 5A are converted into enanthates and contacted with urea, and an adduct containing isopropyl enanthate is withdrawn. The raffinate contains the enanthates of 5-methyl-2-hexanol and tertiary butyl alcohol. Neither of these alcohols nor any of their esters form adducts with urea.

The esterification step of our process may be carried out by any of the procedures taught in the art. We may, for example, commingle our alcohol charging stock with an aliphatic carboxylic acid and distill the mixture in the presence of an acidic catalyst, such as sulfuric acid, toluenesulfonic acid, or the like, withdrawing the water of reaction as an alcohol azeotrope or as an azeotrope with an entraining agent, suitably benzene, toluene, or the like. Suitable carboxylic acids may be chosen from the broad classes of straight-chain aliphatic carboxylic acids and monomethyl-branched aliphatic carboxylic acids, the specific chain length and carbon skeleton being determined by the nature of the alcohols in the charging stock and the relative urea-reactivity of carboxylic acid esters, as set forth above in detail. We may use the acids as such, or in the form of their anhydrides, mixed acid anhydrides, acid halides, or other compounds affording the desired acids. Alternatively, we may use any of the foregoing classes of acids or acid-affording compounds wherein the carbon chain contains an olefinic double bond, and/or a hydroxyl group, and/or a fluorine atom substituted for a hydrogen atom or atoms.

Our invention will be more fully understood from the following specific examples. All of the

Example I

Nineteen parts of a mixed alcohol fraction containing predominantly $C_{10}$ alcohols, obtained from the hydrocarbon phase produced by the hydrogenation of carbon monoxide at 600° F. and 250 pounds per square inch in the presence of a fluidized, alkali-promoted iron catalyst, were treated with 22 parts of acetyl chloride, and from the resulting reaction product were fractionally distilled 23 parts of ester.

The esters were agitated at room temperature for one hour in contact with 120 parts of urea, 4 parts of methanol, and 126 parts of pentane. The resulting slurry was filtered, and the solid adduct (I) was washed thoroughly with pentane. Thereafter, the adduct was dissolved in 500 parts of distilled water, and the aqueous solution was extracted twice with ethyl ether. The combined ether extracts were fractionally distilled, and 15.2 parts of n-decyl acetate were isolated, having an index of refraction ($n_D^{20}$) of 1.4275, compared with the literature value of 1.4270.

The pentane wash liquid from the adduct (I) was distilled, and from it were recovered 7.5 parts of esters. The recovered esters were treated for one hour at room temperature with 60 parts of urea, 4 parts of methanol, and 63 parts of pentane, and the resulting slurry was filtered and further processed as before. From the urea adduct (II) were separated two parts of n-decyl acetate, having an index of refraction ($n_D^{20}$) of 1.4269.

The pentane wash liquid from the adduct (II) was distilled, and from it were recovered 5.3 parts of esters. These esters were saponified by treatment for eight hours under reflux conditions with 105 parts of 0.5 N aqueous sodium hydroxide and 40 parts of methanol. From the saponification product, 4.5 parts of mixed alcohols were recovered by fractional distillation.

The recovered alcohols were treated for one hour at room temperature with 60 parts of urea, 4 parts of methanol, and 126 parts of pentane, and the resulting slurry was processed as before. From the urea adduct (III) were recovered 1.1 parts of material containing 10.0 percent of oxygen, corresponding to a calculated value of 9.3 percent oxygen for 2-undecanol, and an index of refraction ($n_D^{20}$) of 1.4370, compared with the literature value of 1.4369.

The pentane wash liquid from the adduct (III) was distilled, and from it were recovered 3.3 parts of mixed branched-chain alcohols.

Example II

A solution of 17.2 parts of the acetate of 1-octanol in 70 parts of isooctane was commingled with 90 parts of urea and 3 parts of methanol, and the mixture was agitated at room temperature for 30 minutes. The resulting slurry was filtered and the separated solid material was washed twice with isooctane, 53 parts of isooctane being used for each wash. The washed solid was then dried and dissolved in an excess of water, and the resulting organic phase, comprising substantially pure n-octyl acetate, was withdrawn. The aqueous urea phase was extracted twice with 71 parts of ethyl ether to recover additional n-octyl acetate dissolved therein, and the extracts were dried, distilled until free from ether, and combined with the organic (n-octyl acetate) phase. The recovered n-octyl acetate measured 15 parts, corresponding to 87 percent of the material initially charged.

In a similar experiment, the acetate of 2-octanol failed to form a solid adduct with urea.

In a series of calorimetric experiments, the heat of reaction of urea with the acetate of 1-octanol was found to be 8.5 kilocalories per gram-mole of the ester, whereas the heat of reaction with the acetate of 2-octanol was found to be only 1.3 kilocalories. These results demonstrate that the 1-octanol ester forms a stable adduct, whereas the 2-octanol ester does not.

Our invention is broadly suitable for the separation of alcohols as hereinbefore described and illustrated, and it is to be understood that we may use any of the apparatus, unit operations, techniques, processing materials, and procedures conventionally employed in the chemical and chemical engineering arts in adapting and applying our invention to specific problems. In this connection, it is also to be understood that any modifications or equivalents that would ordinarily occur to those skilled in the art are to be considered as lying within the scope of our invention.

In accordance with the foregoing description, we claim as our invention:

1. In a process for separating an aliphatic alcohol, unbranched except for a maximum of one methyl group, from a mixture thereof with a urea-unreactive organic compound, the steps which comprise converting said alcohol in said mixture into a monomethyl-branched aliphatic ester wherein the straight-chain terminal portion containing the characteristic carbonyloxy group

contains also a total of at least four methylene groups, contacting said mixture with urea, and withdrawing a solid adduct containing urea and said ester.

2. In a process for separating an aliphatic alcohol, unbranched except for a maximum of one methyl group, from a mixture thereof with a urea-unreactive compound, the steps which comprise converting said alcohol in said mixture into a monomethyl-branched aliphatic ester wherein the straight-chain terminal portion containing the characteristic carbonyloxy group contains also a total of at least four methylene groups, contacting said mixture with urea and a urea solvent at a temperature between about 20 and 75° C. for a period in excess of around 0.1 hour, the molar ratio of urea to said ester being at least equal to the number of methylene groups in said straight-chain terminal portion of said ester, and withdrawing a solid adduct containing urea and said ester.

3. The process of claim 1 wherein said ester has the skeletal formula

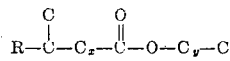

where R is a straight-chain aliphatic radical, where $x$ and $y$ are selected from the class consisting of zero and the positive integers, where the sum of $x$ and $y$ is at least four, where $C_x$ represents a straight carbon chain when $x$ is greater than one, where $C_y$ represents a straight carbon chain when $y$ is greater than one, where said ester contains not more than one olefinic double bond, not more than one hydroxyl group, and not more than one fluorine atom, and where otherwise unsatisfied bonds of the carbon atoms are attached to hydrogen atoms.

4. The process of claim 3 wherein said ester has the structural formula $$R-\underset{\underset{CH_3}{|}}{C}H-(CH_2)_x-\underset{\underset{}{\overset{O}{\|}}}{C}-O-(CH_2)_y-CH_3$$

5. The process of claim 1 wherein said ester has the skeletal formula $$R-\underset{\underset{C}{|}}{C}-C_x-O-\overset{\overset{O}{\|}}{C}-C_y-C$$

where R is a straight-chain aliphatic radical, where $x$ and $y$ are selected from the class consisting of zero and the positive integers, where the sum of $x$ and $y$ is at least four, where $C_x$ represents a straight carbon chain when $x$ is greater than one, where $C_y$ represents a straight carbon chain when $y$ is greater than one, where said ester contains not more than one olefinic double bond, not more than one hydroxyl group, and not more than one fluorine atom, and where otherwise unsatisfied bonds of the carbon atoms are attached to hydrogen atoms.

6. The process of claim 5 wherein said ester has the structural formula $$R-\underset{\underset{CH_3}{|}}{C}H-(CH_2)_x-\overset{\overset{O}{\|}}{C}-(CH_2)_y-CH_3$$

7. In a process for separating an aliphatic alcohol, unbranched except for a maximum of one methyl group, from a mixture thereof with a urea-unreactive organic compound, the steps which comprise converting said alcohol in said mixture into a monomethyl-branched ester wherein the straight-chain terminal portion containing the characteristic carbonyloxy group contains also a total of at least four methylene groups, contacting said mixture with urea, withdrawing a solid adduct containing urea and said ester, decomposing said adduct and recovering the ester contained therein, and decomposing the recovered ester and recovering said alcohol therefrom.

8. In a process for separating a monomethyl-branched primary aliphatic alcohol from a mixture thereof with urea-unreactive organic compound, the steps which comprise converting said monomethyl-branched primary aliphatic alcohol into a monomethyl-branched ester wherein the straight-chain terminal portion containing the characteristic carbonyloxy group contains also a total of at least four methylene groups, contacting the mixture of organic compounds containing said ester with urea, and withdrawing a solid adduct containing urea and said ester.

9. In a process for separating a mixture of organic compounds containing a primary straight-chain aliphatic alcohol and a secondary straight-chain aliphatic alcohol, the steps which comprise esterifying said mixture with a compound selected from the group consisting of monomethyl-branched aliphatic carboxylic acids and compounds affording a monomethyl-branched aliphatic carboxylic acid, whereby said primary alcohol is converted into a monomethyl-branched ester wherein the straight-chain terminal portion containing the characteristic carbonyloxy group contains also a total of at least four methylene groups, contacting the esterified mixture with urea, and withdrawing a solid adduct containing urea and said monomethyl-branched ester.

10. In a process for separating a secondary straight-chain aliphatic alcohol having the hydroxyl group in the 2 position from a mixture thereof with a secondary alcohol having the hydroxyl group in another position, the steps which comprise esterifying said mixture with a compound selected from the group consisting of straight-chain aliphatic carboxylic acids and compounds affording a straight-chain aliphatic carboxylic acid, whereby said alcohol having the hydroxyl group in the 2 position is converted into a monomethyl-branched ester wherein the straight-chain terminal portion containing the characteristic carbonyloxy group contains also a total of at least four methylene groups, contacting the esterified mixture with urea, and withdrawing a solid adduct containing urea and said monomethyl-branched ester.

NORMAN J. BOWMAN.
ALFRED W. WEITKAMP.

REFERENCES CITED

The following references are of record in the file of this patent:

UNITED STATES PATENTS

| Number | Name | Date |
|---|---|---|
| 1,733,440 | Zeitschel | Oct. 29, 1929 |
| 1,830,859 | Schotte et al. | Nov. 10, 1931 |
| 2,072,806 | Wood | Mar. 2, 1937 |
| 2,388,688 | Hass | Nov. 13, 1945 |
| 2,499,820 | Fetterly | Mar. 7, 1950 |

OTHER REFERENCES

Technical Oil Mission, Reel 143, translation by Shell Development Co., of German application B 190,197 (Bengen) deposited in Library of Congress May 22, 1946 (included in Index released May 31, 1946) (5 pages, pages 2-6 inclusive only).